Jan. 8, 1935.  R. P. MAY  1,987,406

TALKING MOTION PICTURE PROJECTOR

Filed Sept. 12, 1929  5 Sheets-Sheet 1

INVENTOR
RUSSELL P. MAY
BY
ATTORNEY

Jan. 8, 1935. R. P. MAY 1,987,406
TALKING MOTION PICTURE PROJECTOR
Filed Sept. 12, 1929 5 Sheets-Sheet 2

INVENTOR
RUSSELL P. MAY
BY
ATTORNEY

Jan. 8, 1935.　　　　　R. P. MAY　　　　1,987,406

TALKING MOTION PICTURE PROJECTOR

Filed Sept. 12, 1929　　5 Sheets-Sheet 3

INVENTOR
RUSSELL P. MAY
BY
ATTORNEY

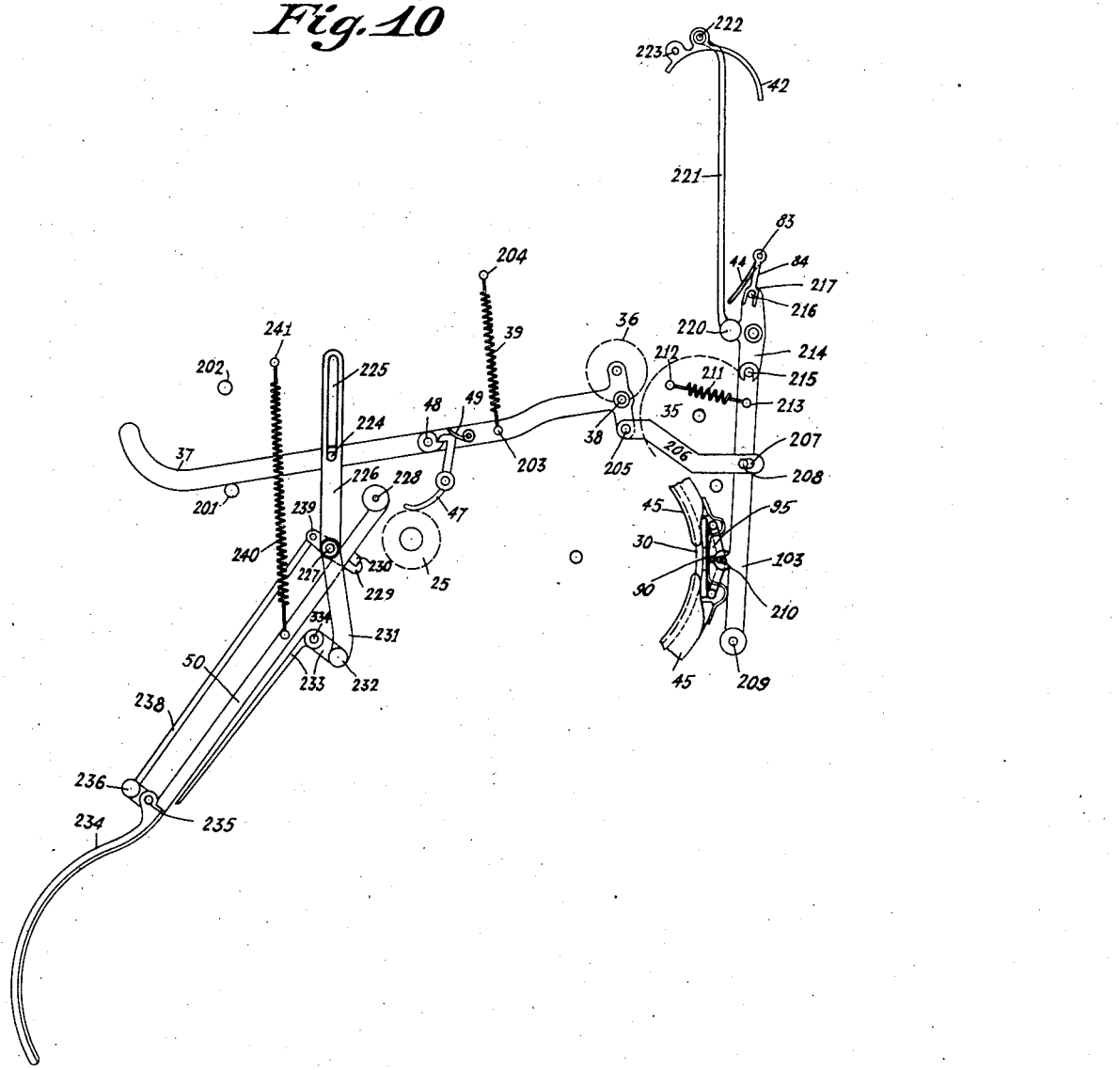

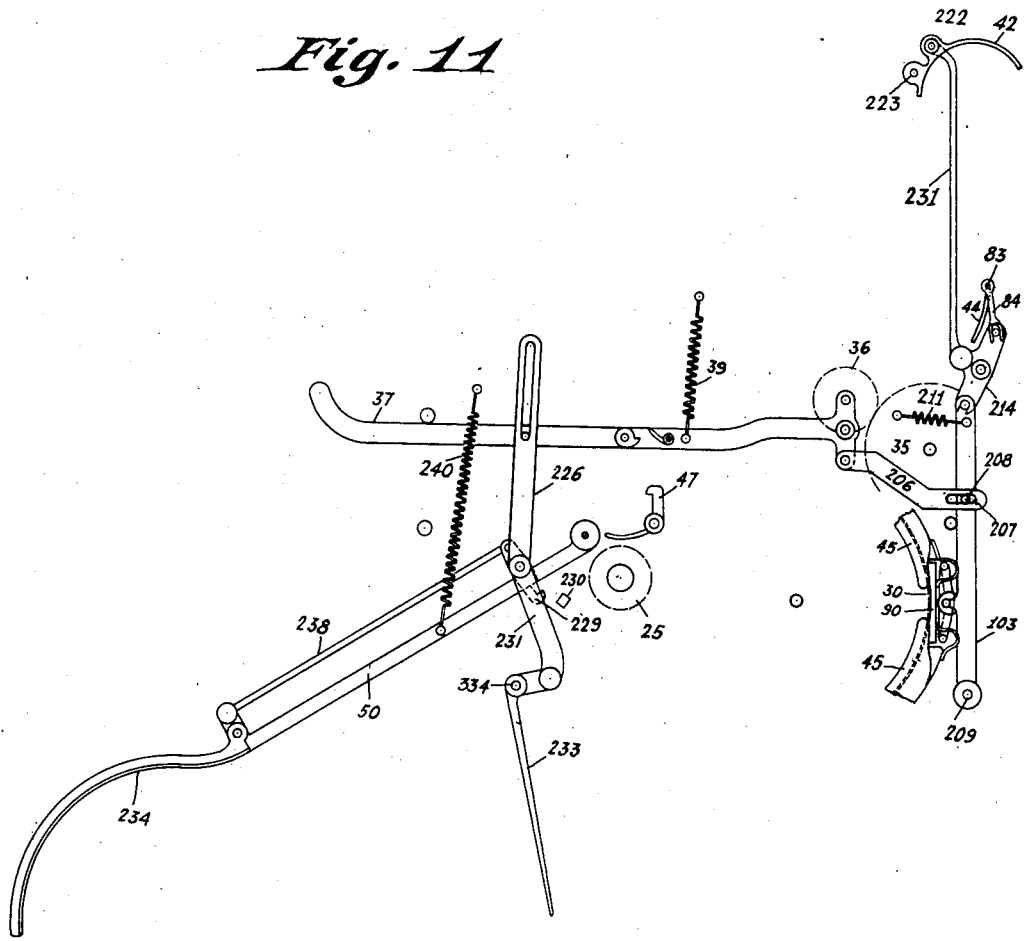

Patented Jan. 8, 1935

1,987,406

UNITED STATES PATENT OFFICE 1,987,406

TALKING MOTION PICTURE PROJECTOR

Russell P. May, Bronx, N. Y., assignor to Radio Corporation of America, a corporation of Delaware Application September 12, 1929, Serial No. 392,051

30 Claims. (Cl. 88—16.2)

In the past, a machine for projecting motion pictures has required many special adjustments and manipulations, and is altogether so complicated that it requires a more or less experienced operator in order to properly operate it. This has been a serious drawback in the development of the home motion picture field, as the difficulty experienced by the home operator often precludes a thorough enjoyment of motion pictures in the home.

With the advent of talking motion pictures, this problem has been increased, because of the fact that a more complicated arrangement is necessary, due to the additional continuous motion of the film past the sound reproducing apparatus.

Various machines have been proposed for accomplishing the threading of a motion picture projector automatically, or more commonly, in a semi-automatic manner, that is, in a manner requiring simple manipulation but not requiring adjustments.

It is, therefore, the primary object of the present invention to produce a machine which is entirely automatic, that is one in which all of the manipulations, as well as the adjustments, are done without the aid of the operator. This is, so far as the inventor is aware, the first talking motion picture machine in which the operation of threading is entirely automatic.

A broader object of this invention is to provide an improved motion picture or talking motion picture projector more particularly of the type adapted for use in the home.

Another object of this invention is to provide a motion picture projector or a talking motion picture projector which may be readily threaded by an inexperienced operator.

Another object of this invention is to provide a motion picture projector wherein the loops required because of the intermittent motion of the film past the film gate are properly formed automatically.

Still another object of this invention is to provide means whereby the film may be connected to a take-up reel automatically, requiring no control on the part of the operator.

A yet further object of this invention is to provide means for accurately positioning the film at the sound gate.

A further object of this invention is to provide means for producing a continuous speed within a high degree of accuracy past the sound gate.

A still further object of this invention is to provide means for moving the film picture gate to the operative position after the film is threaded.

Still another object of this invention is to provide means for actuating the various loop forming mechanisms and gate release mechanisms by the action of the film itself.

A still further object of this invention is to provide a new and improved film take-up reel.

A still further object of this invention is to provide an improved optical system for a talking moving picture projector which system has a more convenient arrangement of parts.

These and additional objects of my invention will become apparent with the following specification taken in conjunction with the accompanying drawings.

In accomplishing my invention, a film guiding channel through which the film is urged by a continuously rotating sprocket, is arranged with certain movable portions so that, after the film has passed through the said channel and the projection is ready to commence, these portions of the channel are automatically moved so as to permit the film to be moved intermittently and to permit the action of film loops.

The film is pulled through the machine and around a reproducing drum by a second continuously rotating sprocket. Rotation of the drum is produced by the action of the film. Tension upon the film around the drum is maintained by a damping roller in combination with a pressure roller which presses the film against the said damping roller.

In the feeding operation, the film is pushed through a channel around the reproducing drum, which channel is of sufficient width to permit a certain amount of slack of the film to be retained by the damping roller and pressure roller when they are put into operation and the film is drawn taut against the reproducing drum. This causes an accumulation of film above the damping roller as the film is continuously fed by the upper continuously rotating sprocket whereas its motion is momentarily retarded by the damping roller and pressure roller until the lower continuously rotating sprocket removes the slack existing between it and the damping roller.

Means are provided to rotate the lower continuously rotating sprocket which controls the speed of the film over the reproducing drum at an unvarying rate of speed, said means comprising a fly-wheel attached to the sprocket shaft and driven through a spring connection by the driving motor.

During the threading operation the film picture gate is in an open position and exerts no pressure on the film. Furthermore, due to the position of the movable portion of the said gate, the intermittent may operate without engaging the holes in the film. Similarly the film sound gate pressure pad is removed from its operating position and exerts no pressure on the film. Likewise the pressure roller is not in contact with the damping roller and the film is permitted to pass freely therebetween.

As the film passes freely through the guide channel and around the lower continuous motion sprocket, its end engages a trigger which causes the threading release to operate, closing the two film gates and putting the pressure roller into contact with the friction roller.

The film is guided from the lower continuously rotating sprocket to the take-up reel where a hole in the end of the film is caught by a spring pressed plunger in the hub of the reel. A plurality of similar spring-pressed plungers, arranged around the periphery of the drum, are depressed into the hub by the pressure of the film as it surrounds the hub. As the reel rotates, the guide which guided the film into contact with its hub, is caused to move by the increasing amount of film being built up. When this motion has been sufficient, the guide is automatically released and moves, under the pressure of a spring to an inoperative position.

A single means is provided for restoring the entire threading release device to the feeding position. This means comprises a hand operated lever, and the operation of this lever together with the insertion of the end of the film into a funnel-like opening at the top of the machine, is all that is required to be done by the operator in order to feed the film through the machine.

Having thus briefly described my invention, reference is now invited to the accompanying drawings wherein:

Fig. 10 is a diagram showing the operation of the threading release mechanism in the threading position;

Fig. 11 is a similar diagram showing the threading release mechanism in the operating position.

Figure 1:
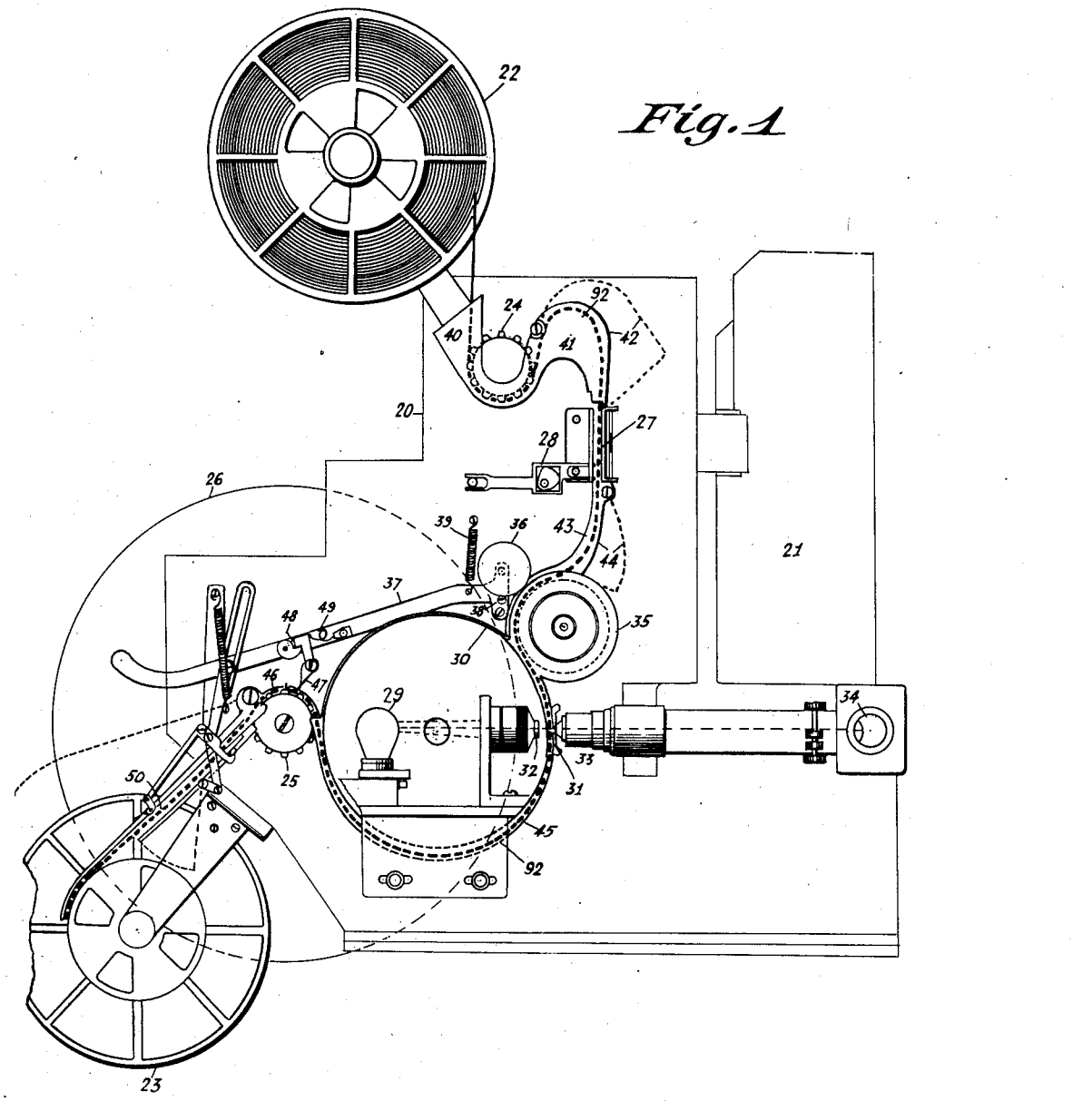
Fig. 1 is a general elevation showing the principal elements embodying my invention.

Attention is now particularly invited to Fig. 1, wherein 20 represents the frame of the machine. For furnishing the light for projecting the pictures, there is provided a lamp housing 21 equipped with condensing lenses, lamps, etc., the details of which are well known in the art and form no part of the present invention.

The supply reel for the film is shown at 22 above the frame of the machine, and the take-up reel is shown at 23.

For removing the film from the reel 22 and passing it through the machine, in the threading operation, as well as during running, there is provided a continuously rotating sprocket 24. For pulling the film through the lower part of the machine, and more particularly around the reproducing drum, there is provided a similar continuously rotating sprocket 25. These two sprockets are driven by a common shaft rotated by a motor of any appropriate design. The sprocket 25 is driven through a mechanical filter which will be described more in detail hereinafter. The details of the driving mechanism, except as just noted, constitute no part of the present invention and are therefore not being described.

As part of the driving mechanism of the continuous motion sprocket 25, there is provided a fly-wheel 26 which is directly connected to the shaft of the said continuously rotating sprocket 25, and which is driven by a positively driven grid member through a spring arrangement which will be described later.

The picture projector includes the film gate 27, for passing the film in an intermittent motion past which is provided the intermittent motion device 28. The intermittent is driven by the common driving motor in any appropriate manner. The details of the intermittent and its driving means are well known and need not be described herein.

For reproducing the sound recorded upon the film, there is provided a light source 29, mounted in any appropriate manner inside of the sound reproducing drum 30. The light from the source 29 is focused upon the film 92 at the film gate 31 by means of the lens system 32. For projecting the image of the illuminated film upon the photoelectric cell 34, there is provided an optical system including the objective lens 33. The construction of this optical system is well known and it includes a screen having a slot therein upon which the image of the film is focused. The light from this slot is focused upon the photoelectric cell and variations of the light intensity vary the latter's resistance to operate a sound reproducer.

For preventing any effect of the intermittent motion of the film at the picture gate 27 from reaching the film at the sound gate 31, and also for holding the film in contact with the reproducing drum 30, there is provided the damping roller 35 against which the film is pressed by the pressure roller 36. The pressure roller 36 is mounted upon an arm of the threading release operating lever 37, which latter is pivoted at 38 and so arranged as to cause the pressure roller 36 to be pressed against the film by spring 39.

For guiding the film into contact with the upper continuously rotating sprocket 24, there is provided a funnel-shaped guide 40. After passing the sprocket 24 the film is guided through the upper loop guide 41 which includes a movable section 42 which may be moved from the position shown in heavy lines to that shown in dotted lines. The film is thus passed between the separable parts of the picture gate 27 and through the lower loop guide 43 which latter includes a second movable section 44 which may be moved from the position shown in heavy lines to that shown in dotted lines.

For guiding the film around the sound reproducing drum 30, there is provided the guide 45, which it is to be noted is disposed at the lower portion thereof, a greater distance from the surface of the drum than at other portions. This is for the purpose of later permitting an accumulation of the film between the film picture gate 27 and the damping roller 35, as will be explained more in detail hereinafter. For guiding the film from the reproducing drum 30 to and around the continuously rotating sprocket 25, there is provided the guide 46 through an aperture in which projects the releasing trigger 47. The trigger 47, during the threading operation engages the catch 48 on the threading release operating lever 37; it being pressed into engagement with said catch by means of the trigger spring 49.

The film while being passed around sprocket 25, being bent in a curve, has sufficient stiffness to move the trigger 47, and after the lever 37 has been moved by the spring 39 into the operating position there is no longer a pressure by the trigger spring 49 upon the trigger 47, so that the latter does not press upon the film.

For attaching the end of the film to the take-up reel 23, there is provided a take-up mechanism 50 which will be described more in detail hereinafter.

Figure 2:
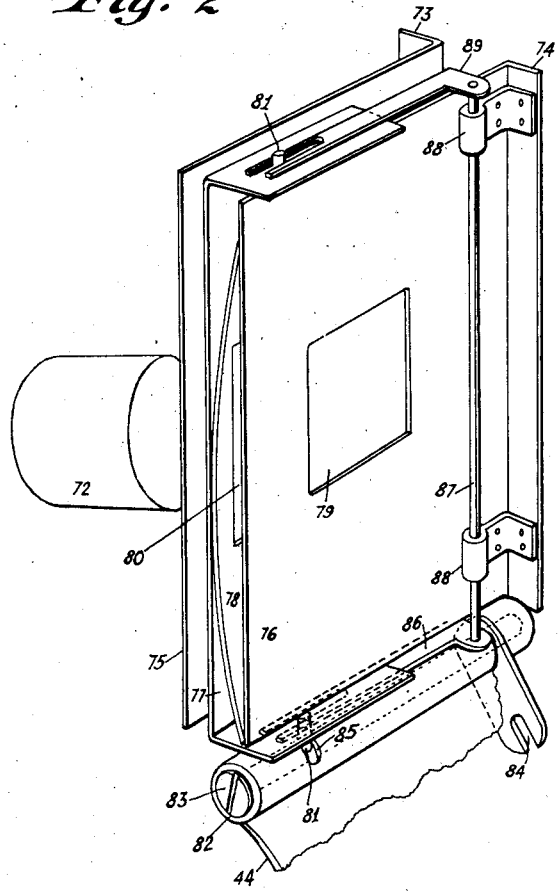
Fig. 2 is a projection detail showing the film picture gate.

Attention is now invited to Fig. 2 which illustrates the film gate used in this embodiment of my invention. The film gate comprises two stationary members 75 and 76 which have flanges 73 and 74 respectively, by which they are attached to the frame 20, shown in Fig. 1. The movable picture pressure pad 77 is a U-shaped member which is normally pressed toward the stationary member 75 by means of the flat picture pressure pad spring 78. The film is thus pressed by the pad 77 against the member 75. Apertures 79 and 80 are provided in member 76 and the pad 77 respectively, and an aperture, not shown, is provided through the member 75 through all of which apertures the light for projecting the image of the film upon a screen may pass through the film and through the lens 72 and thus be projected upon the screen.

For removing the pressure of the pressure pad 77 from the film, against the pressure of spring 78, said pressure pad is provided with pins 81 and 81' disposed in the opposite ends thereof as shown. For supplying motion to the film pressure pad there is provided a cylindrical member 82 mounted upon a pin 83 screwed or otherwise fastened to the frame of the machine. This cylindrical member has in its face an arcuate slot 85 and is operated by a lever 84, as will be described more in detail hereinafter. When the cylindrical member 82 is rotated to the right, the pin 81' will be engaged by the end of the slot 85 and moved thereby to the right to release the pressure of the pad 77 against the film. A similar motion is transmitted to the upper end of pad 77 by means of the arm 86 which has a forked portion in engagement with the pin 81'. The arm 86 is mounted on the shaft 87 which in turn is mounted in bearings 88, secured to the flange 74 of the stationary gate member 76. The upper end of the shaft 87 has secured thereto a similar arm 89, the forked end of which engages the pin 81, thus translating the motion of the lower end of the member 77 to the upper end of the same member. Attached to the cylindrical member 82 is the movable guide section 44, so that when the member 82 is revolved to the left to permit the pad to exert pressure on the film, the gate 44 will be moved to its dotted position as shown in Fig. 1.

Figure 3:
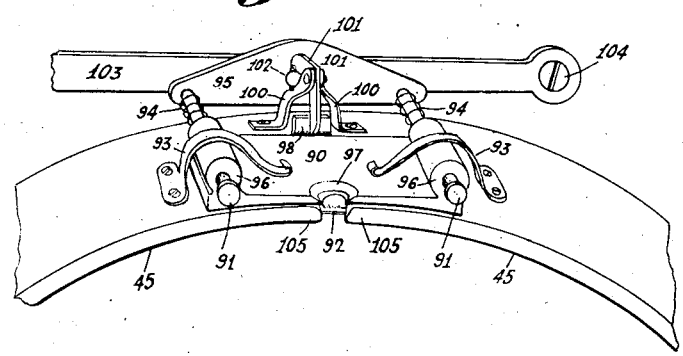
Fig. 3 is a projection detail showing the film sound gate.
Figure 4:
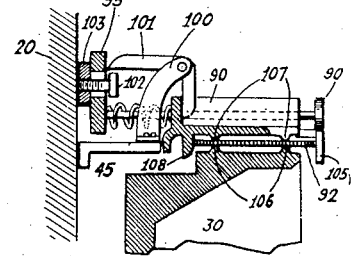
Fig. 4 is a cross-section through the sound gate as shown in Fig. 3.

Attention is now invited to Figs. 3 and 4 which show the details of the sound gate. In a cutaway portion of the guide 45 which surrounds the reproducing drum, is placed the sound gate pressure pad 90 which is slidably mounted by bosses 96 on pins 91 which are mounted in the yoke member 95. The sound gate has two degrees of freedom, and is pressed against the film 92 by means of the pressure pad springs 93. The pressure pad 90 is caused to press sideways against the film 92 with respect to a lip 108, by means of the springs 94 which surround the pins 91.

For removing the pressure of the pressure pad 90 from the film during the threading operation, there is provided the yoke member 95 in which the pins 91 are mounted. The yoke member 95 is loosely mounted upon the sound gate pressure pad lever 103 by means of a pin 102, on said lever which pin is inserted through an elongated slot in the yoke member 95, so that when the lever 103 is in the operating position, the member 95 is free to move in either direction and the pad 90 is thus free to press upon the film 92 under the influence of springs 93. The lever 103 is pivoted at 104 to the frame 20 and is operated in a manner to be described later.

For relieving the sideways pressure of the pressure pad 90 upon the film 92, there is provided a lever 101 which is mounted upon the guide 45 by means of the supports 100. One arm of the lever 101 engages the head of the pin 102, and the other arm engages a flange 98 upon the pressure pad 90. Thus, as the pressure pad lever 103 is moved, the pin 102 engages the lever 101 and the pressure pad 90 is moved sideways against the pressure of the springs 94 before the pin 102 engages the end of the elongated slot in 95 and moves the pressure pad 90 away from the film against the pressure of the springs 93.

For permitting the projection of the image of the sound portion of the film 92 through the optical system upon the photo-cell, there is provided a cutout portion 97 in the pressure pad 90.

Reference is now called particularly to Fig. 4. This figure shows the lever 103 in the operating position so that the springs 94 press the pressure pad 90 to the right, and the lip 108 presses against the side of the film 92 and presses it against the side of the lips 105 of the guide 45.

The contact with the film by the reproducing drum 30 is through the bosses 106 cut thereon, and the sliding contact with the film by the pressure pad 90 is through the bosses 107.

Figure 5:
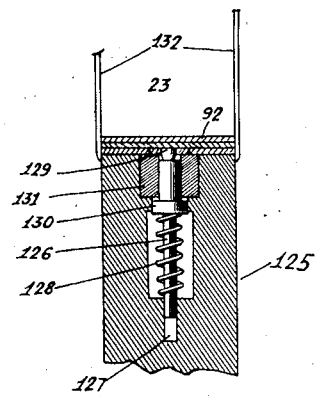
Fig. 5 is a detail of the take-up reel.

Fig. 5 shows the details of one of a plurality of pins inserted in the hub of the take-up reel 23 of Fig. 1. The take-up reel has a hub 125 in an aperture 127 of which is inserted the spring pressed plunger 126. This plunger is pressed by means of the spring 128 acting against the collar 130 so that its end 129 will project a considerable distance beyond the surface of the hub 125. For retaining the plunger in the hub, there is provided a bushing 131 which limits the amount which the pin 129 may project, by cooperation with the collar 130. One of the several pins 126 will engage a hole cut in the end of the film due to the fact that the peripheral speed of the hub is greater than the linear speed of the end of the film. The second layer of the film 92 will cause the pin to be depressed against the pressure of the spring 128 until it is in the position shown. The remaining pins will be depressed by the film until they are flush with the surface of the hub.

Figure 6:
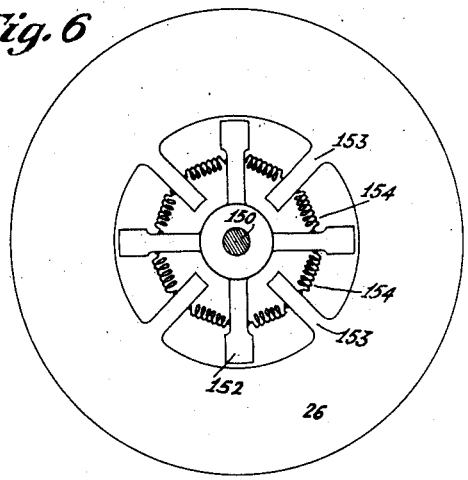
Fig. 6 is a plan view of the driving mechanism for the lower continuously rotating sprocket.
Figure 7:
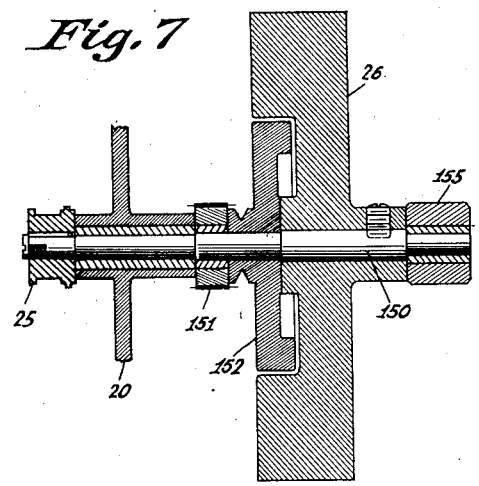
Fig. 7 is a cross-section of the driving mechanism for the lower continuously rotating sprocket.

Attention is now invited to Figs. 6 and 7 which show the mechanical filter for driving the lower continuously rotating sprocket 25 which latter determines the speed of the film at the sound reproducing gate. The sprocket 25 is rigidly mounted on a shaft 150 in any appropriate manner. This shaft 150 is supported by an appropriate bearing in the frame 20 and by a strut bearing 155. Also rigidly mounted on said shaft 150 is the fly-wheel 26. The drive for the continuous speed sprocket is through a gear 151 operated by the common drive shaft from the driving motor, not shown. The gear 151 has attached thereto, the grid 152 and both are loosely mounted upon the shaft 150. The drive of the fly-wheel is through the springs 154 interposed between the projections of the grid 152 and projections 153 of the fly-wheel 26.

Figure 8:
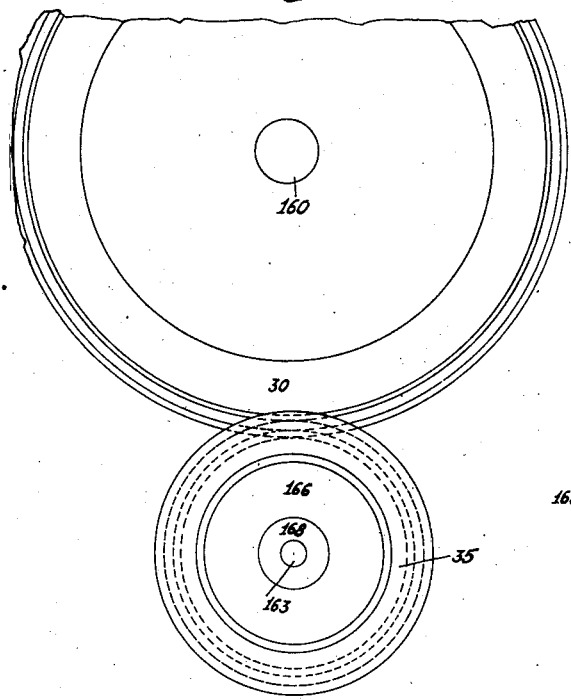
Fig. 8 is a plan view showing the relation of the damping roller and the sound reproducing drum.
Figure 9:
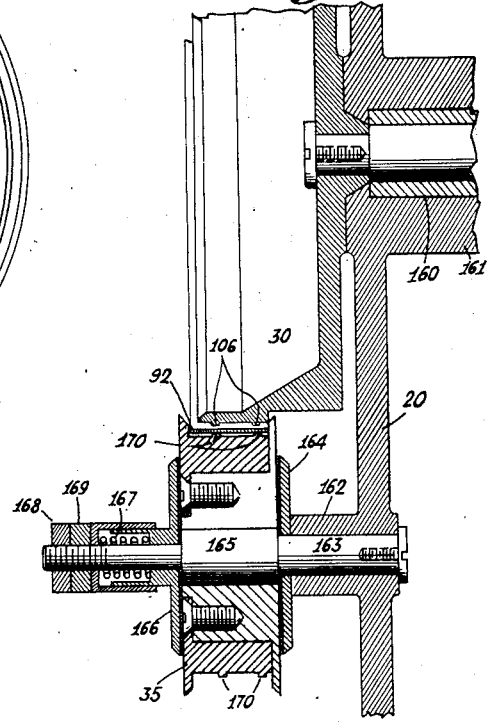
Fig. 9 is a cross-section through the damping roller and sound reproducing drum as shown in Fig. 8.

Attention is now invited to Figs. 8 and 9 which show the details of the sound reproducing drum 30 and the damping roller 35. The reproducing drum 30 is mounted in the bearing 160 arranged in a boss 161 projecting from the frame 20. The damping roller 35 is mounted on a spindle 163 secured in the boss 162 of the frame 20. Between the enlarged portion 165 of the spindle 163 is the friction washer 164 having a friction facing between it and the face of the damping roller 35 which latter, it is to be noted, comprises two parts suitably secured together. The friction washer 164 is keyed to the shaft or otherwise secured to prevent rotation relative thereto. A second friction washer 166 engages the other face of the damping roller 35 and is also keyed to the spindle 163. The pressure of the friction washer 166 against the roller 35 is maintained by the spring 167 and adjusted by means of the nuts 168 and 169. The face of the roller 35 has the bosses 170 for engaging the film which bosses correspond in position to the bosses 106 of the drum 30. These bosses bear on the film to one side of the picture portion of the film and between the picture portion and the sound portion of the film. The film 92 passes freely between the drum 30 and the roller 35, and is maintained in firm contact with the roller 35 by the pressure roller 36 as mentioned above.

Figs. 10 and 11 show the threading and operating positions respectively, of the threading release mechanism of the machine embodying my invention. They will therefore be described at the same time, similar reference figures indicating like parts. The pressure roller 36 is mounted upon the threading release operating lever 37 which is pivoted at 38. The pressure roller is normally held against the damping roller 35 by the spring 39 which is connected between the pin 203 on the lever 37 and pin 204 mounted on the frame of the machine. The lever 37 is maintained in the threading position as shown in Fig. 10, by means of the trigger 47 which engages the catch 48 on said lever and is held in position by the spring 49 as described above. In this position the lever is against the stop 201, the stop 202 being provided to limit the motion of the lever 37 when it is in the operating position as shown in Fig. 11. Opposite to the arm of the lever 37, upon which the pressure roller 36 is mounted, is a second arm having a pivot 205 to which the link 206 is connected.

The other end of the link 206 has a slot 207 which engages a pin 208 on the sound gate pressure pad lever 103, the latter being pivoted at 209 to the frame of the machine. When lever 37 is in the position shown in Fig. 10, the pin 208 is against the inner end of the slot 207 and the pressure pad lever 103 is moved against the tension of the spring 211 which is secured between the pin 212 on the frame of the machine and the pin 213 on the said lever 103. The pin 210 on the lever 103 engages in an elongated slot in the yoke member 95 which serves to move the said member away from the face of the sound drum 30 to permit the film to move between the sound gate pressure pad 90 and the face of the drum 30.

At the upper end of the lever 103 is a pin 215 which engages in a slotted portion of the lever 214 which latter is pivotally mounted to the frame. The other end of the lever 214 has a pin 216 which engages in a slotted portion of the crank 84 operating the movable section 44 of the lower loop guide as described above.

An arm 220 of the lever 214 serves to impart motion to the link 221 which is connected at its upper end 222 to the movable section 42 of the upper loop guide, the latter being pivoted at 223 to the frame of the machine.

A pin 224, on the lever 37, engages an elongated slot 225 of a link member 226 which latter serves by means of the pivotal connection 227 on the take-up mechanism upper guide member 50 to move the latter about the pivot 228, which is mounted in the frame of the machine against the tension of the spring 240 connected between it and the pin 241, also in the frame of the machine. The guide member 50 is retained in this position by means of the latch 229 which engages a catch 230 secured to the frame of the machine.

A link 231, connected to the member 50 at 227, imparts motion to the bottom guide 233 which latter is pivoted to the frame of the machine at 334. The connection between said member 233 and said link member 231 being on an arm of the bottom guide member 233 at 232.

At the lower end of the member 50 is pivotally mounted at 235 the curved lower guide member 234. The arm 236 projecting from the lower guide member 234 imparts motion through the link 238 to the arm 239 of the latch member 229, so that when the lower guide member 234 is rotated to the right as shown by the accumulation of film on the take-up reel, the latch 229 is released and the members assume the operating positions shown in Fig. 11 under the influence of spring 240.

Having thus described my invention in detail, I will now describe its operation.

Loop forming

The film is fed from the supply reel 22 through the guide 40, and through the gate mechanism 27 by means of the continuously rotating sprocket 24. It is guided by the suitable guides having the general shape of the final loop required, and having considerable clearance to permit the free movement of the film. In the case of the upper loop guide the movable section 42 is provided and upon completion of the threading operation, this movable portion opens out to assure the complete clearance of the film loop when the picture projection begins.

The picture gate is composed of two stationary members 75 and 76 between which the movable picture pressure pad 77 is mounted and held against 75 by means of a flat spring 78. It is necessary to back off this pressure pad 77 during the threading operation. This is accomplished in connection with the operation of the lower loop guide mechanism. One side 44 of the lower loop guide is movable being pivoted at 82 adjacent to the lower edge of the picture gate. The arcuate slot 85 is provided in the portion 82 of the movable guide section 44 and rotates about the pivot 83. The pin 81' attached to the lower end of the picture gate pressure pad 77, projects into this slot and, upon the rotation of the movable guide section about the pivot, it becomes engaged with the end of the slot and is carried with it causing the member 77 to be moved against the spring tension. This permits free passage of the film between the stationary gate member 77 and the movable pressure member 76. In order to cause a similar motion at the top end of the pressure pad 77, the pin 81 is provided and the two pins are coupled together by means of the levers 86 and 89 mounted on the common shaft 87.

The movable section 44 of the lower loop guide, when in the position shown by the continuous lines in Fig. 1, forms the lower side of the lower film guide. When the machine is operating, this member rotates to the right as shown by the dotted lines, thus also permitting the spring 78 to press the pressure pad 77 against the film between it and the gate member 75.

During the threading operation the upper continuously rotating sprocket 24 feeds the film down to the bottom of the picture gate at which point the intermittent 28 becomes operative and feeds the film through the remaining mechanism. However, the pressure exerted by the film against the intermittent by the flat spring 78, when the gate is in the open position, is not sufficient to injure the film providing the intermittent does not properly engage the sprocket holes. In other words, the pressure pad 77 may move further to the right as shown in Fig. 2 while in the threading position to permit the film to clear the points of the intermittent 28. However, upon the release of the pressure pad 77, the engagement between the film and the intermittent becomes positive.

The opening of the movable section 42 of the upper film guide forms the upper loop.

The lower loop is formed in a different manner. The lower guide through which the film passes from the picture gate 27 to the drum 30 is restricted and does not allow a free motion of the film other than that which would permit it to pass easily therethrough. The section 44 of the guide 43 is movable as shown. During the threading operation this movable section 44 is closed and the film is forced through it and around the damping roller and through the sound drum guides 45 to the lower continuously rotating sprocket 25. The space allowed in the sound drum guides is sufficient to allow considerable amount of slack film to be stored up.

After the threading operation is completed, the pressure roller 36 presses the film against the damping roller 35, and additional film is prevented from passing around the damping roller until the lower continuously rotating sprocket has removed all of the slack around the sound drum. This permits the intermittent to accumulate a certain amount of film between the film gate and the damping roller 35. The intermittent 28, however, continues to supply film which accumulates and forms a loop in the space provided by the opening of the movable guide section 44. The time required to do this, determines the amount of film which will accumulate and thereby the size of the loop.

Mechanical filter

The lower continuously rotating sound sprocket 25 determines the speed by which the film is pulled past the sound gate 31, and it therefore must be driven at a very constant speed. The power for driving this sprocket comes from the main motor through several gear connections and it is essential that any variation due to these gears and to other reasons should be eliminated. In order to accomplish this a very heavy fly-wheel 26 is mounted on the sprocket shaft, as shown more particularly in Figs. 6 and 7. This flywheel is driven by means of the spider 152 through the springs 154 in such a manner that the springs tend to absorb slight variations in speed and they in conjunction with the fly-wheel constitute a mechanical filter. To some extent, such a system is oscillatory and must be damped to a certain degree. This is accomplished by means of the damping roller 35 and pressure roller 36, the tension between which is so proportioned as to give the best results, taking into account the values of the fly-wheel weight and the spring tension. The film between the sprocket 25 and the damping roller 35 is that part which is used for the sound reproduction and it is pulled around the freely rotating drum 30 which has a minimum of friction and weight.

Film actuated release

As shown the entire threading release mechanism is operated by a single lever 37 which when it is desired to thread the machine is pulled down manually and held there in the position shown in Fig. 10 by the latch 47—48. The trigger 47 has a lever which lies in a central portion of the lower continuously rotating sprocket. As the film is picked up by this sprocket and carried around it, it is also carried under this trigger and, due to the stiffness created by the film being bent around the sprocket, the film is able to raise the trigger and unlatch the lever 37. During the picture projection, the trigger 47 has no spring tension which would hold it against the film, the tension for holding the trigger into position being supplied by the trigger spring 49 mounted on the lever 37 which when in the raised position is not in contact with the trigger 47.

Film take-up mechanism

Connected with the threading release operating lever 37 is the lower film take-up mechanism generally indicated at 50. The take-up guide is caused to be pushed down and partially around the take-up reel by the link 226 which is engaged by a pin 224 on the lever 37 acting in the elongated slot 225. However, the release of the threading release lever 37 by the action of the film passing around the sprocket 25 above described, has no effect on the take-up guide mechanism as the pin 224 rides freely in the slot 225 when the lever 37 moves to its operating position. The take-up guides thus remain in position until the film has wound up to a certain extent at which time they are independently released as will be described later.

The upper take-up guide 50 is of channel cross-section, and the bottom guide 233 cooperates therewith to direct the film toward the hub of the drum. At a plurality of points around the periphery of the hub of the take-up reel as is described above, are located spring-pressed plungers whose ends project about ⅛ of an inch above the surface of the hub of the drum, and as the film is fed down to the drum and partially around it by the curved portion of the lower take-up guide 234, one of these plungers engages in a hole in the end of the film due to the fact that the drum is driven at a slightly greater speed than the film. The cross-section of this lower take-up guide is so designed as to allow these plungers to pass freely even though the guide is in contact with the hub at its edges. After the film has become engaged with a plunger and is securely caught thereto, the film is automatically put under tension which is sufficient to depress all the succeeding pins and also to cause the second layer of film to depress the pin which caught the end of the film.

After a predetermined amount of the film has been wound up on the reel, its diameter is increased to a degree which causes the lower guide to be lifted up about the hinge 235 and thereby cause the guide mechanism to be unlatched. Then, due to the action of the spring 240, the take-up guides are moved to the position shown in Fig. 11, which position permits them to clear the take-up reel.

Sound gate method of operation

It is necessary in the reproduction of a film sound record that the record be very accurately placed before the reproducing system to eliminate to the very greatest possible extent any tendency to weave sideways or move to and from the reproducing system which would cause imperfections in the sound reproduction. In the present machine, the focus of the sound record must be extremely accurate at all times as a high power objective is used in the reproducing system. In order to accomplish this my device operates as follows:

The sound gate pressure pad 90 is connected with the main threading release lever 37 in order to be released from its operating position. This pressure pad in its operating position bears against the film, holding it tightly in contact with the free drum. The pad has in addition to the main bearing surface indicated at 107 in Fig. 4, a lip formation 108 which bears against the edge of the film 92, and a spring tension is furnished by the springs 94 to thus hold the film against the lips 105 of the sound drum guide 45. During the threading process the pressure pad must be moved so as not to obstruct the free passage of the film, and due to its double guide function as just described, it must be moved in such a way that both bearing surfaces are out of the way of the film. This is accomplished by means of the lever 101 which slides the pad sideways against the pressure of springs 94 just before the lever 103 moves the pressure pad against the pressure of springs 93.

Optical system

As shown in Fig. 1 the reproducing lamp or light source 29, is arranged inside of the drum 30 and the light is condensed or focused upon the portion of the film, overhanging the sound drum 30 at the sound gate 31, by means of the lens 32 already described. The photoelectric cell 34 is arranged outside of the drum and the image of the minute portion of the film thus illuminated is focused on it by means of the microscopic arrangement generally indicated at 33, thus limiting the light falling upon the photoelectric cell to that passing through a very small linear portion of the film. More particularly this is done by means of a mechanical slit interposed between the objective in the microscope and the photoelectric cell 34. The impulses created in the photoelectric cell 34 are used to reproduce the sounds recorded upon the film in the usual appropriate manner, the details of which constitute no portion of the present invention.

Thus it can be seen that means have been provided for automatically feeding the film through a talking motion picture projector, which further provides means for projecting the picture portion of the film and means for reproducing the sound recorded upon the sound portion of the talking motion picture film.

Various modifications may come within the scope of my invention as defined by the above objects and described in the accompanying specification and it is to be understood that I am not to be limited by the specific embodiment shown and described solely for the purpose of illustration, but by the scope of the invention as set forth in the appended claims.

I claim:

1. In a talking motion picture machine, means for threading a film therethrough comprising, means for automatically forming the loops which are necessary, due to the intermittent motion of the film through a portion of said machine, positioning means for maintaining the film in the proper position while being projected as an image upon a screen, positioning means for holding said film in the proper position while it is being reproduced as to the sound portion thereof, means for moving said loop forming means to threading and operating positions, means for moving said picture positioning means to threading and operating positions, means for moving said sound reproducing positioning means to threading and operating positions, a common manually operated means for operating said three last mentioned means, film operated means for releasing said last mentioned means to move said loop forming means and positioning means from threading position to operating position, film take-up means, means for guiding the film to said take-up means and securing it thereto, said last mentioned means being movable to threading position by said manually operated means, and independent means operated by the increase of film upon said take-up means for moving said guiding means to operating position.

2. In a talking motion picture machine, means for threading a film therethrough comprising, means for automatically forming the loops which are necessary, due to the intermittent motion of the film through a portion of said machine, positioning means for maintaining the film in the proper position while being projected as an image upon a screen, positioning means for holding said film in the proper position while it is being reproduced as to the sound portion thereof, means for moving said loop forming means to threading and operating positions, means for moving said picture positioning means to threading and operating positions, means for moving said sound reproducing positioning means to threading and operating positions, a common manually operated means for operating said three last mentioned means, and film operated means for releasing said last mentioned means to move said loop forming means and positioning means from threading position to operating position.

3. In a talking motion picture machine, means for automatically threading a film therethrough comprising, means for automatically forming the loops which are necessary, due to the intermittent motion of the film through a portion of said machine, positioning means for maintaining the film in the proper position while being projected as an image upon a screen, and while it is being reproduced as to the sound portion thereof, means for moving said loop forming means to threading and operating positions, means for moving said picture positioning means to threading and operating positions, a common manually operated means for operating said two last mentioned means from operating to threading positions, film operated means for releasing said last mentioned means to permit said loop forming and positioning means to move from threading position to operating position, film take-up means, means for guiding the film to said take-up means and securing it thereto, said last mentioned means being movable to threading position by said manually operated means, and independent means operated by the increase of film upon said take-up means, for moving said guiding means to operating position.

4. In a motion picture machine, means for threading a film therethrough comprising, means for automatically forming the loops which are necessary, due to the intermittent motion of the film through a portion of said machine, means for maintaining the film in the proper position while being projected as an image upon a screen, releasing means for moving said loop forming means to threading and operating positions, releasing means for moving said picture positioning means to threading and operating positions, a common manually operated means for operating each of said releasing means from operating to threading positions, film operated means for releasing said last mentioned means to permit said loop forming and positioning means to move from threading to operating positions, film take-up means, means for guiding the film to said take-up means and securing it thereto, said last mentioned means being movable to threading position by said manually operated means, and means for moving said guiding means to operating position.

5. In a talking motion picture machine, means for threading a film therethrough comprising, means for automatically forming the loops which are necessary, due to the intermittent motion of the film through a portion of said machine, positioning means for holding the film in the proper position while it is being reproduced as to the sound portion thereof, releasing means for moving said loop forming means to threading and operating positions, releasing means for moving said positioning means to threading and operating positions, a common manually operated means for operating said releasing means to move said loop forming and positioning means from operating position to threading position, film operated means for releasing said last mentioned means, film take-up means, means for guiding the film to said take-up means and securing it thereto, said last mentioned means being movable to threading position by said manually operated means, and means operated by the increase of film upon said take-up means for moving said guiding means to the operating position.

6. In a talking motion picture machine having picture projecting and sound reproducing positions, means for threading a film therethrough comprising, means for automatically forming the loops which are necessary, due to the intermittent motion of the film through a portion of said machine, positioning means for holding the film in the proper position in relation to sound and picture reproducing means during reproduction, releasing means for moving said loop forming means to threading and operating positions, releasing means for moving said positioning means to threading and operating positions, a common manually operated means for operating said releasing means to move said loop forming and positioning means from operating position to threading position, and film operated means for releasing said last mentioned means.

7. In a talking motion picture machine, means for threading a film therethrough comprising, means movable to threading and operating position for automatically forming the loops, positioning means movable to threading and operating position, for holding the film in the proper position while it is being reproduced as to the sound portion thereof, manually operated means for moving said loop forming and positioning means from operating position to threading position, film operated means for releasing said last mentioned means, film take-up means, means for guiding the film to said take-up means and securing it thereto, said last mentioned means being movable to threading position by said manually operated means, and means operated by the increase of film upon said take-up means for moving said guiding means to the operating position.

8. In a talking motion picture machine having picture projecting and sound reproducing positions, means for threading a film therethrough comprising, means movable to threading and operating position for automatically forming the loops, positioning means movable to threading and operating position for holding the film in the proper position in relation to sound and picture reproducing mechanism during sound reproduction, manually operated means for moving said loop forming and positioning means from operating position to threading position, and film operated means for releasing said last mentioned means.

9. In a motion picture machine, means for threading a film therethrough comprising, means for automatically forming the loops which are necessary due to the intermittent motion of the film through a portion of said machine, positioning means for maintaining the film in the proper position while it is being projected as an image upon a screen, releasing means for moving said loop forming means to threading and operating positions, releasing means for moving said picture positioning means to threading and operating positions, a common manually operated means for operating said releasing means to move said loop forming and positioning means from operating position to threading position, film operated means for releasing said last mentioned means, film take-up means, means for guiding the film to said take-up means and securing it thereto, said last mentioned means being movable to threading position by said manually operated means, and means operated by the increase of film upon said take-up means for moving said guiding means to operating position.

10. In a motion picture machine, means for threading a film therethrough comprising, means for automatically forming the loops which are necessary due to the intermittent motion of the film through a portion of said machine, positioning means for maintaining the film in the proper position while it is being projected as an image upon a screen, releasing means for moving said loop forming means to threading and operating positions, releasing means for moving said picture positioning means to threading and operating positions, a common manually operated means for operating said releasing means to move said loop forming and positioning means from operating position to threading position, film operated means for releasing said last mentioned means, film take-up means, means for guiding the film to said take-up means and securing it thereto, said last mentioned means being movable to threading position by said manually operated means, and means for moving said guiding means to operating position.

11. In a motion picture machine, means for threading a film therethrough comprising means, movable to threading and operating position for automatically forming the loops, positioning means for maintaining the film in the proper position while it is being projected as an image upon a screen, manually operated means for moving said loop forming and positioning means from operating position to threading position, film operated means for releasing said last mentioned means, film take-up means, means for guiding the film to said take-up means and securing it thereto, said last mentioned means being movable to threading position by said manually operated means, and means operated by the increase of film upon said take-up means for moving said guiding means to operating position.

12. A sound motion picture projector which comprises, means for automatically threading the film through said projector including means for forming the loops required by the intermittent motion of the film, means for accurately positioning the film at the picture projection and sound reproducing points, each of said means being movable to threading and operating positions, film take-up means also movable to threading and operating positions, manually operable means for moving said means to the threading position, film actuated means for causing said threading and positioning means to be moved to operating position, and a second film actuated means for moving said take-up means to the operating position, means for projecting the picture portion of the film upon a screen, means for supplying film, and means for reproducing the sound recorded upon said film including, means for moving the film at a highly constant rate of speed comprising a mechanical filter and a film damping mechanism, said mechanism being adapted to cooperate with the loop forming means to form said loops.

13. A sound motion picture projector which comprises, means for automatically threading the film through said projector including means for forming the loops required by the intermittent motion of the film, means for accurately positioning the film at the picture projection and sound reproducing points, each of said means being movable to threading and operating positions, film take-up means also movable to threading and operating positions, manually operable means for moving said means to the threading position, film actuated means for causing said threading and positioning means to be moved to operating position, and a second film actuated means for moving said take-up means to the operating position, and means for reproducing the sound recorded upon said film including, means for moving the film at a highly constant rate of speed comprising a mechanical filter and a film damping mechanism, said mechanism being adapted to cooperate with the loop forming means to form said loops.

14. A sound motion picture projector which comprises, means for automatically threading the film through said projector including means for forming the loops required by the intermittent motion of the film, means for accurately positioning the film at the picture projection and sound reproducing points, each of said means being movable to threading and operating positions, film take-up means also movable to threading and operating positions, manually operable means for moving said means to the threading position, film actuated means for causing said threading and positioning means to be moved to operating position, and a second film actuated means for moving said take-up means to the operating position, and means for reproducing the sound recorded upon said film including, means for moving the film at a highly constant rate of speed including a film damping mechanism adapted to cooperate with the loop forming means to form said loops.

15. A sound motion picture projector which comprises, means for automatically threading the film through said projector including means for forming the loops required by the intermittent motion of the film, means for accurately positioning the film at the picture projection and sound reproducing points, each of said means being movable to threading and operating positions, film take-up means also movable to threading and operating positions, manually operable means for moving said means to the threading position, film actuated means for causing said threading and positioning means to be moved to operating position, and a second film actuated means for moving said take-up means to the operating position.

16. A motion picture projector which comprises, means for automatically threading the film through said projector including means for forming the loops required by the intermittent motion of the film, means for accurately positioning the film at the picture projection point, each of said means being movable to threading and operating positions, film take-up means also movable to threading and operating positions, a single manually operable means for moving said means to the threading position, film actuated means for causing said threading and positioning means to be moved to operating position, and a second film actuated means for moving said take-up means to the operating position.

17. In a motion picture machine, means for forming the loops necessary for the intermittent motion of the film past the picture film gate which comprises a continuously rotating sprocket, a picture gate including an intermittent mechanism, an upper loop guide through which the film is led from said continuously rotating sprocket to said picture gate and intermittent mechanism, a second continuously rotating sprocket, adapted to pull the film from the intermittent, a damping roller, a pressure roller for cooperating with said damping roller, a guide channel between said last mentioned sprocket and said damping roller which channel will contain a greater linear amount of film while the film is being threaded therethrough than when it is being pulled therethrough from between the damping roller and pressure roller by said last mentioned sprocket, a lower loop guide between said picture gate and said damping roller, means for moving said damping roller and a pressure roller into threading and operating positions, a movable portion of each of said loop guides, means for operating said movable portions from threading to operating position, and means for moving said movable loop guide portions to the operating positions and moving said pressure roller and damping roller to operative position simultaneously, when the film being threaded through the machine has reached said second continuously rotating sprocket, whereby an upper loop is formed by the removal of the movable portion of the upper loop guide, and whereby a lower loop is formed, in the space provided by moving the movable portion of the guide between said picture film gate and said damping roller to the operating position, by the excess film passed by the intermittent while the lower continuously rotating sprocket is removing the excess film from the guide channel between it and the damping roller.

18. In a motion picture machine, means for forming the loops necessary for the intermittent motion of the film past the picture film gate which comprises a continuously rotating sprocket, a picture gate including an intermittent mechanism, an upper loop guide through which the film is led from said continuously rotating sprocket to said picture gate and intermittent mechanism, a second continuously rotating sprocket, adapted to pull the film from the intermittent, a damping roller, a pressure roller for cooperating with said damping roller, a guide channel between said last mentioned sprocket and said damping roller which channel will contain a greater linear amount of film while the film is being threaded therethrough than when it is being pulled therethrough from between the damping roller and pressure roller by said last mentioned sprocket, a lower loop guide between said picture gate and said damping roller, means for moving said damping roller and a pressure roller into threading and operating positions, means for moving said picture gate to threading and operating positions, a movable portion of each of said loop guides, means for operating said movable portions from threading to operating position, and means for simultaneously moving said movable loop guide portions and said picture gate to the operating positions and also moving said pressure roller and damping roller to operative position simultaneously, when the film being threaded through the machine has reached said second continuously rotating sprocket, whereby an upper loop is formed by the removal of the movable portion of the upper loop guide, and whereby a lower loop is formed, in the space provided by moving the movable portion of the guide between said picture film gate and said damping roller to the operating position, by the excess film passed by the intermittent while the lower continuously rotating sprocket is removing the excess film from the guide channel between it and the damping roller.

19. In a motion picture machine, means for forming the loops necessary for the intermittent motion of the film past the picture film gate which includes, a picture gate including an intermittent mechanism for intermittently moving the film by said gate, a continuously rotating sprocket, adapted to pull the film from the intermittent, a damping roller, a pressure roller for cooperating with said damping roller, a guide channel between said sprocket and said damping roller which channel will contain a greater linear amount of film while the film is being threaded therethrough than when it is being pulled therethrough from between the damping roller and pressure roller by said sprocket, a lower loop guide between said picture gate and said damping roller, means for moving said damping roller and pressure roller into threading and operating positions, a movable portion of said loop guide, and means for simultaneously moving said movable loop guide portion to the operating positions and moving said pressure roller and damping roller to operative position simultaneously, when the film being threaded through the machine has reached said continuously rotating sprocket, whereby a lower loop is formed, in the space provided by moving the movable portion of the guide between said picture film gate and said damping roller to the operating position, by the excess film passed by the intermittent while the continuously rotating sprocket is removing the excess film from the guide channel between it and the damping roller.

20. In a motion picture machine, means for forming the loops necessary for the intermittent motion of the film past the picture film gate which includes, a picture gate including an intermittent mechanism for intermittently moving the film by said gate, a continuously rotating sprocket, adapted to pull the film from the intermittent, a damping roller, a pressure roller for cooperating with said damping roller movable to threading and operating positions, a guide channel between said sprocket and said damping roller which channel will contain a greater linear amount of film while the film is being threaded therethrough than when it is being pulled therethrough from between the damping roller and pressure roller by said sprocket, and means for moving said pressure roller and damping roller to operative position when the film being threaded through the machine has reached said continuously rotating sprocket, whereby a loop is formed, by the excess film passed by the intermittent while the continuously rotating sprocket is removing the excess film from the guide channel between it and the damping roller.

21. In a motion picture machine, means for forming the loops necessary for the intermittent motion of the film past the picture film gate which includes, a picture gate including an intermittent mechanism for intermittently moving the film by said gate, a continuously rotating sprocket, adapted to pull the film from the intermittent, a damping roller, a pressure roller for cooperating with said damping roller movable to threading and operating positions, a guide channel between said sprocket and said damping roller which channel will contain a greater linear amount of film while the film is being threaded therethrough than when it is being pulled therethrough from between the damping roller and pressure roller by said sprocket, and means for moving said pressure roller and damping roller to operative position, whereby a loop is formed, by the excess film passed by the intermittent while the continuously rotating sprocket is removing the excess film from the guide channel between it and the damping roller.

22. In a motion picture machine, means for forming the loops necessary for the intermittent motion of the film past the picture film gate which includes an intermittent mechanism for intermittently moving the film, a continuously rotating sprocket, adapted to pull the film from the intermittent, a damping roller, a pressure roller for cooperating with said damping roller, movable to threading and operating positions, a guide channel between said sprocket and said damping roller which channel will contain a greater linear amount of film while the film is being threaded therethrough than when it is being pulled therethrough from between the damping roller and pressure roller by said last mentioned sprocket, and means for moving said pressure roller and damping roller to operative position, whereby a loop is formed, by the excess film passed by the intermittent while the lower continuously rotating sprocket is removing the excess film from the guide channel between it and the damping roller.

23. In a talking motion picture machine, means for threading said machine including, means for forming loops, a picture film gate adapted to be moved to threading and operating positions, a damping roller for controlling the speed of the film in reproducing sound recorded thereon, a pressure roller for cooperation with said damping roller and adapted to hold the film in contact therewith movable to threading and operating positions, a sound film gate movable to threading and operating positions, a single means for moving said loop forming apparatus, said pressure roller and said film gates from operating to threading positions, and a trigger release mechanism for releasing said single means, and permitting it to move to the operating position, said trigger being operatively related to the film being threaded through the machine, whereby said film operates to move each of said means into the operating position by coacting with said trigger.

24. In a motion picture machine, self-threading means which include, a take-up reel having a hub portion, a plurality of spring-pressed plungers disposed in said hub portion and adapted to catch the end of the film, means for rotating said take-up reel, guide means for guiding the film from said motion picture machine to said take-up reel, movable from threading position to operating position and including, an upper guide, a lower guide, and a bottom guide, said upper guide and said bottom guide being hinged to said machine and said lower guide being hinged to said upper guide, a single means for moving said guides into the threading position, spring means for normally retaining said guides in said operating position, latch means for retaining said guides in the threading position, and link means connected with said lower guide and so arranged as to operate said latch means whereby when a sufficient amount of film has been built up on the hub of said take-up reel, said latch is released and said guides move to the operating position.

25. In a motion picture machine, self-threading means which include a take-up reel, means for rotating said take-up reel, guide means for guiding the film from said motion picture machine to said take-up reel, movable from threading position to operating position and including, an upper guide, a lower guide, and a bottom guide, said upper guide and said bottom guide being hinged to said machine and said lower guide being hinged to said upper guide, means for moving said guides into the threading position, and latch means for retaining said guides in said threading position, link means connected with said lower guide and so arranged as to operate said latch mechanism whereby when a sufficient amount of film has been built up on the hub of said take-up reel, said latch is released and said guides move to the operating position.

26. In a motion picture machine, self-threading means which include, a take-up reel, guide means for guiding the film from said motion picture machine to said take-up reel, movable from threading position to operating position, means for moving said guides into the threading position, latch means for retaining said guides in said threading position, and link means connected with one of said guides and with said latch means and so arranged as to operate said latch means whereby when a sufficient amount of film has been built up on the hub of said take-up reel, said latch is released and said guides move to the operating position.

27. In a motion picture machine, a picture gate comprising two stationary members, a movable member mounted therebetween, a spring member between one of said stationary members and said movable member to push the latter into contact with a film interposed between it and the other stationary member, a guide for said film after it passes said picture gate, a movable section for said guide to permit the formation of a loop below said picture gate, a pivotal mounting for said movable section, including a slotted sleeve portion, means for moving said section to threading and operating positions, a pin upon said movable gate member projecting into the slotted portion of said pivotal mounting, a second pin at the other end of said movable gate member, lever means for transmitting the motion of said first mentioned pin to said second mentioned pin whereby, when said movable guide section is moved to the threading position, said movable gate member is moved against the pressure of said spring member to move it away from said stationary gate member and thus release the film.

28. In a motion picture machine, a picture gate including two stationary members, a movable member mounted therebetween, a spring member between one of said stationary members and said movable member to push the latter into contact with a film interposed between it and the other stationary member, a pivoted member including a slotted sleeve portion, means for moving said member to threading and operating positions, a pin upon said movable gate member projecting into the slotted portion of said pivoted member, a second pin at the other end of said movable gate member, lever means for transmitting the motion of said first mentioned pin to said second mentioned pin whereby when said pivoted member is moved to the threading position, said movable gate member is moved against the pressure of said spring member to move it away from said stationary gate member, and thus release the film.

29. In a motion picture machine, a picture gate mechanism comprising a motion picture gate movable to threading and operating positions, a guide for said film after passing said picture gate, a movable section for said guide to permit the formation of a loop below said picture gate, a pivotal mounting for said movable section, including a slotted sleeve portion, means for moving said section to threading and operating positions, a pin adapted to operate said gate, projecting into the slotted portion of said pivotal mounting, whereby when said movable guide section is moved to the threading position, said gate is moved positively to the threading position to release the film.

30. In a motion picture machine, a picture gate mechanism comprising a motion picture gate movable to threading and operating positions, a pivoted member including a slotted cylindrical sleeve portion parallel and adjacent to said gate, means for moving said member to threading and operating positions, and a pin adapted to operate said gate projecting into the slotted portion of said pivotal member whereby, when said pivoted member is moved to the threading position, said gate is moved positively to the threading position to release the film.

RUSSELL P. MAY.